Aug. 23, 1966 E. L. NEWMAN ET AL 3,268,820

TIMING PULSE GENERATOR HAVING SELECTIVE PULSE SPACING

Filed Dec. 4, 1963 2 Sheets-Sheet 1

INVENTORS
ERWIN L. NEWMAN &
FUH-LIN WANG

BY John V. Regan
ATTORNEY

INVENTORS
ERWIN L. NEWMAN &
FUH-LIN WANG
BY John V. Regan
Attorney

United States Patent Office 3,268,820
Patented August 23, 1966

3,268,820
TIMING PULSE GENERATOR HAVING SELECTIVE PULSE SPACING

Erwin L. Newman, Philadelphia, Pa., and Fuh-lin Wang, Levittown, N.J., assignors to Radio Corporation of America, a corporation of Delaware Filed Dec. 4, 1963, Ser. No. 327,953
7 Claims. (Cl. 328—62)

This invention relates to pulse generator systems, and particularly to improved systems for generating sequences of timing pulses.

It is customary in electronic systems such as data processing systems to provide sequences of accurately controlled timing pulses in order to synchronize the different circuits which may be involved in various system operations. The choice of a particular type of timing pulse generator depends upon a number of factors including the number of timing pulses required to sequence the different operations; the length or duration required for particular timing pulses; whether or not spacing between successive sequences is desired; whether the operation is synchronous or asynchronous, and so on. In general, a particular timing pulse generator designed for one type of system is not suitable for use in another type of system without extensive modifications. For example, a timing pulse generator for a synchronous system usually is not suitable for use in either an asynchronous system, or a system which is both synchronous and asynchronous. This is so because the generation of asynchronous pulses is a function of the time required for the various units to perform their operations and such time is data dependent. Also, a timing pulse generator designed to produce continuous sequences each of $n$ timing pulses, for example, would not be suitable for use in a system in which each sequence requires $(n-1)$ timing pulses. In the latter case, an undesired delay is introduced between successive sequences of the timing pulses.

It is an object of the present invention to provide an improved timing pulse generator which is readily adaptable for use in various types of electronic systems.

Another object of the present invention is to provide an improved timing pulse generator capable of providing various sequences of timing pulses.

Another object of the invention is to provide an improved timing pulse generator which can provide sequences of timing pulses which are either all synchronous, all asynchronous, or some synchronous and some asyncronous as desired.

A timing pulse generator according to the present invention employs a pair of pulse oscillators and a counter. One of the oscillators is used to generate odd numbered ones of the timing pulses and the other oscillator is used to generate even numbered ones of the timing pulses. The oscillators also each provide an output to alternately advance the count in the counter. The outputs from odd numbered stages of the counter are applied as enabling inputs to the first oscillator and the outputs from the even numbered stages of the counter are coupled as enabling inputs to the second oscillator. Certain of the outputs of each of the oscillators also are cross-coupled as inhibiting inputs to the other oscillator.

In operation, one of the oscillators generates a timing pulse in accordance with a signal from the counter. This oscillator also generates a signal to advance the counter. The inhibit signal from this oscillator further prevents the other oscillator from producing a timing pulse so long as the one oscillator is active. Upon termination of this one oscillator timing pulse, the inhibiting signal is removed from the other oscillator and a second timing pulse is generated. This latter pulse in turn advances the counter and applies an inhibiting signal to the one oscillator, and so on.

n the case of asynchronous operation, additional enabling inputs are coupled to the oscillators to prevent the generation of any succeeding timing pulse until the operation initiated by the preceding timing pulse has terminated.

Successive sequences of either odd or even numbers of timing pulses can be generated, for example, by coupling an output of one or more of the higher order stages of the counter back to the first stage.

Figures 1, 3:
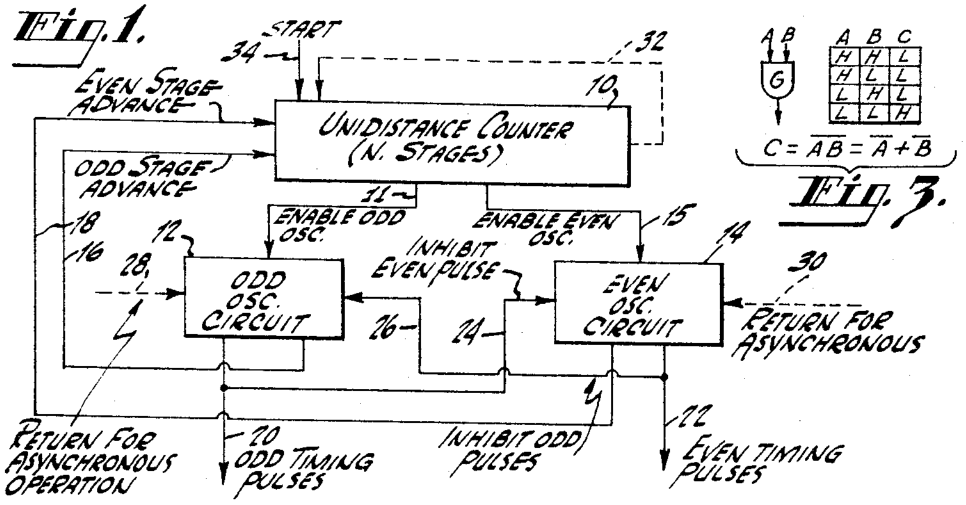
FIGURE 1 is a block diagram of an embodiment of a timing pulse generator according to the invention.
FIGURE 3 is a symbolic diagram of a gate circuit and a Truth Table illustrating the operation of this gate circuit.

The counter 10 of FIGURE 1 is provided with N stages, where N is the maximum number of timing pulses of the longest sequence it is desired to generate. Preferably, the counter 10 is a unidistance counter although other types may be used. With other counter types, however, a more complicated logic would be required at the inputs of the oscillators. Suitable unidistance counters, for example, may be ring counters or shift registers or, in general, a counter arranged such that only one stage changes from a "0" to a "1" condition at any one time.

The output from each odd numbered one of the counter 10 stages is applied via a cable 11 to a first oscillator circuit 12. The circuit 12 is used to generate odd numbered ones of the timing pulses of the sequences. The output from each even numbered one of the counter stages is connected via a cable 15 to a second oscillator circuit 14 used in generating even numbered ones of the timing pulses. The signals appearing on cables 11 and 15, when present, are used as enabling inputs to the oscillator circuits.

The oscillator circuits 12 and 14 have output lines 16 and 18, respectively, connected to advance inputs of the counter 10.

In the drawing, for convenience, single lines are used to indicate the interconnection between the various units. A line may represent a multi-conductor cable such as 11 or a single conductor. In FIGURE 1, the start and advance inputs to the counter 10 are single conductors and the remaining lines are multi-conductor cables.

Odd numbered ones of the timing pulses appear on a cable 20 connected to the output of the odd oscillator circuit 12. Even numbered ones of the timing pulses appear on a cable 22 connected to the output of the even oscillator 14. It is assumed in the present example that a pulse sequence contains an even number of pulses, hence N is even. The timing pulse outputs of the odd oscillator circuit 12 also are connected by way of a cable 24 as inhibiting inputs to the even oscillator circuit 14. The timing pulse outputs of the even oscillator circuits 14 also are connected by way of cable 26 as inhibiting inputs to the odd oscillator circuits 12.

In the case of asynchronous operation, return signals, described in detail later, are applied as inhibiting inputs to the odd and even oscillator circuits 12 and 14 by way of cables 28 and 30, respectively. These latter two cables are shown as dotted lines to indicate that they are used only in the case of asynchronous operation. Similarly, the cable 32 between a higher order counter stage and the input of the first counter stage is indicated by a dotted line to indicate that this connection need be present only in the case when continuous sequences are desired. The start or initiating signals are applied to the first stage of the counter by way of a start lead 34.

Figure 2:
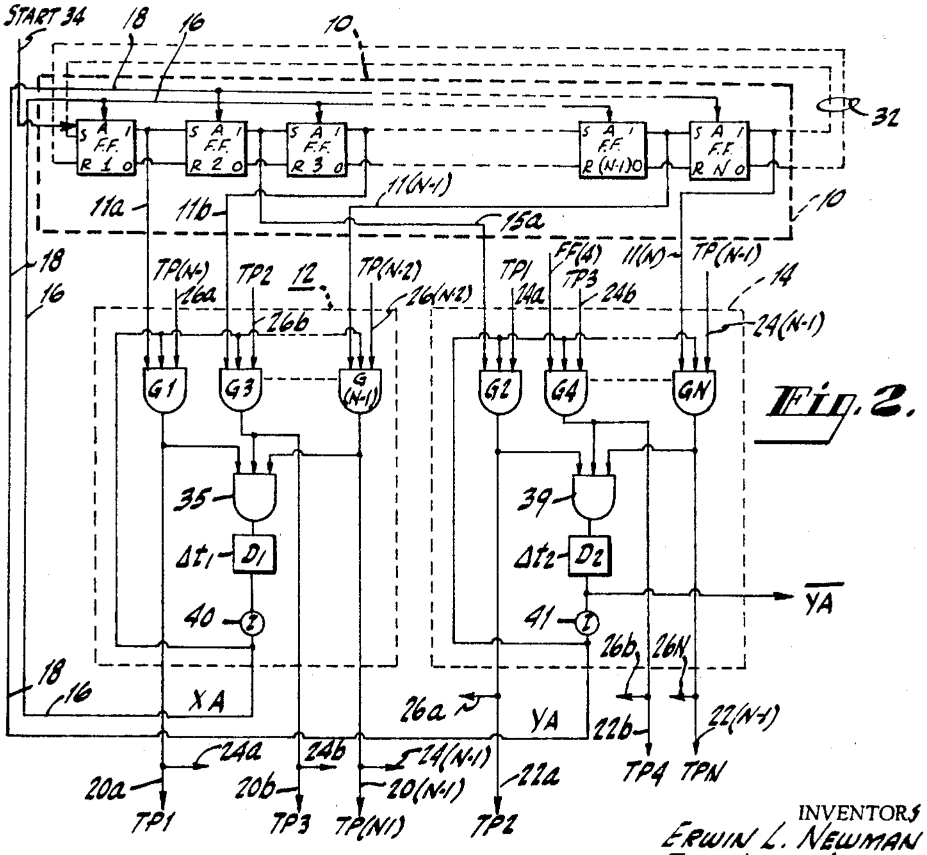
FIGURE 2 is a schematic diagram of the timing pulse generator of FIGURE 1.

As indicated in FIGURE 2, the counter 10 is arranged to have N bistable stages such as the N flip-flop stages. For convenience of drawing, only the first three and the final two stage flip-flops are shown. Each of the other stages is similar to those shown. Each flip-flop is provided with set and reset inputs and corresponding outputs and each has an advance or shift input A. The first flip-flop also has the start input lead 34 connected to its set input. The respective outputs of any one flip-flop are connected to the respective inputs of the next succeeding flip-flop such that the state "set" or "reset" of a one flip-flop is transferred to its succeeding flip-flop when an advance signal is applied to that one flip-flop and the one flip-flop is reset. Other known shift register arrangements may be used. As indicated, the outputs of the Nth last flip-flop may be connected by cable 32 to the inputs of the first flip-flop.

Each of the flip-flops may be conventional transistor flip-flops which have a pair of transistors interconnected with each other so that one is fully conducting and the other non-conducting in the set state, and the conduction states of these two transistors interchange for the reset state. It is assumed that in the set state the "1" output is relatively "low" level with respect to the "0" output, and that the "1" and "0" outputs are respectively "high" and "low" in the reset state. The output line 16 from the oscillator 12, designated XA, is connected to the advance input A of the first, third and successive odd numbered flipflop stages up to the stage (N–1). The output 18 from the even oscillator 14, designated YA, is connected to the advance inputs A of the second and each successive even numbered flip-flop stages of the counter 10 up to the stage N.

Details of the even and odd oscillators 12 and 14 are shown in FIGURE 2. The oscillators are arranged similarly to each other except for the inputs to the respective gates. The oscillator 12 has a set of input gates G1, G3 through G(N–1), each for generating a separate one of the odd numbered timing pulses TP1, TP3 through TP(N–1). The respective outputs of the gates G1, G3 through G(N–1) appear on a corresponding one of the timing pulse output lines 20*a*, 20*b* through 20(N–1). Each of the gates G1, G3 through G(N–1) is also coupled as an input to a common OR gate 35. The gate 35 output is coupled by way of a fixed delay circuit D1 and an inverter 40 to the odd advance line 16. The output of the inverter 40 is also connected as a separate enabling input to each of the input gates G1, G3 through G(N–1). A second input to each of the input gates is applied via one of the lines 11*a*, 11*b* through 11(N–1) of the cable 11. A third input to each of the input gates is applied via one of the lines 26*a*, 26*b* through 26(N–2) of the cable 26 connected to the even oscillator circuit 14.

It is assumed further that the generator of FIGURE 2 is to produce synchronous timing pulses. That is, pulses which begin and terminate at fixed times. Hence, the asynchronous input cables 28 and 30 are not required in the FIGURE 2 embodiment. An arrangement for generating asynchronous timing pulses is described later.

The delay circuit D2 of the even oscillator circuit 14 may have the same delay time or a different delay time from that of the delay circuit D1 of the odd oscillator circuit 12. The input gates G2, G4 through GN receive as first inputs the respective even outputs of the counter stages; as second inputs the signal YA; and as third inputs the signals appearing on the respective lines 24*a*, 24*b* through 24(N–1) of cable 24.

A Truth Table for any one of the gates of the oscillator circuit is shown in FIGURE 3 together with its Boolean equation. It is assumed that a binary "0" is indicated by a relatively "high" level signal, and a binary "1" is indicated by a relatively "low" level signal. Such a convention is convenient when using diode input, transistor gates of known type. The convention of FIGURE 3 is, however, arbitrary and may change with different gating circuits without changing the manner in which the system operates.

Figures 4, 5, 6, 7, 8, 9, 10:
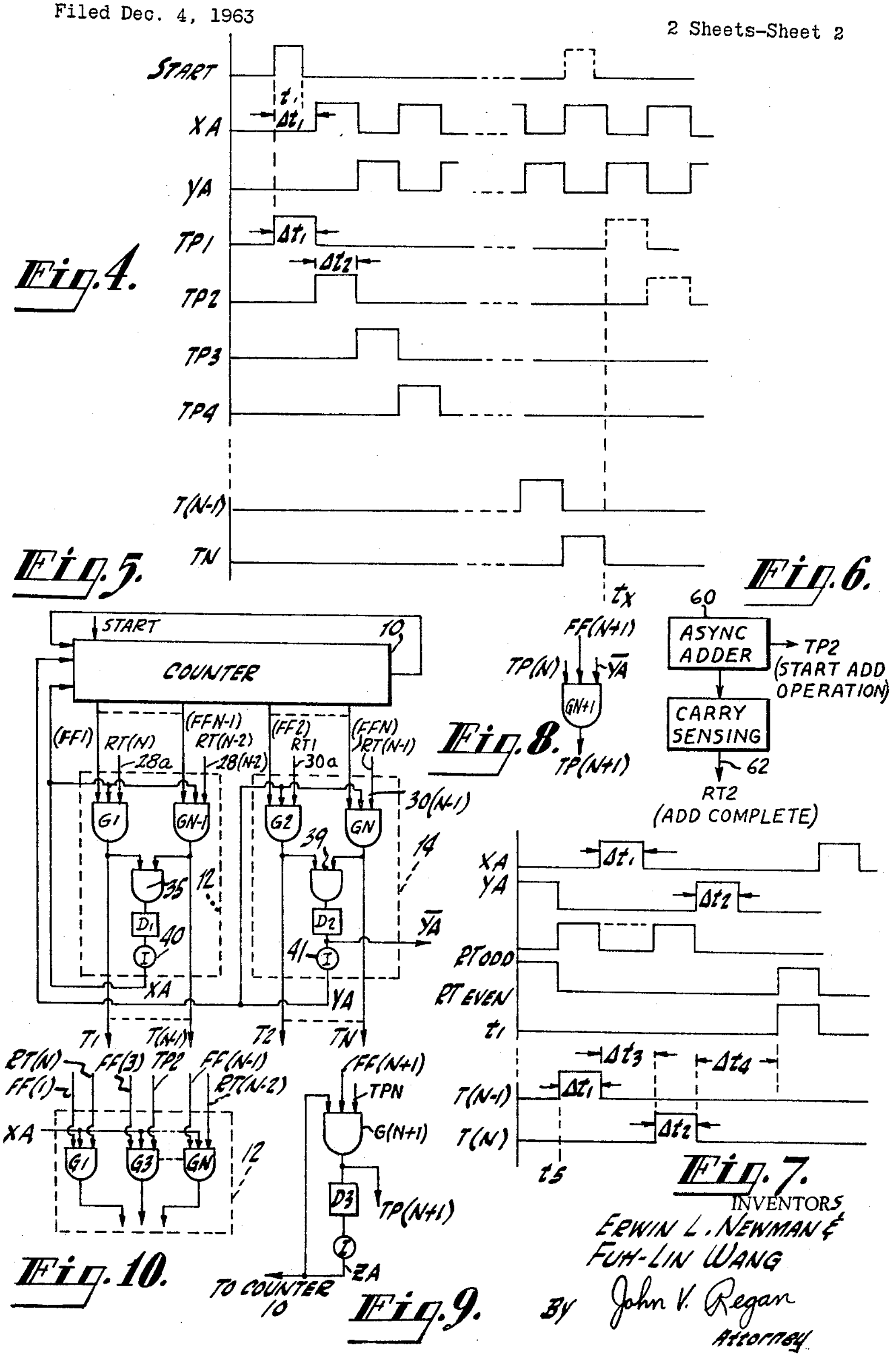
FIGURE 4 is a timing pulse diagram useful in explaining the operation of the invention.
FIGURE 5 is a schematic diagram of an embodiment of an asynchronous pulse generator according to the invention.
FIGURE 6 is a schematic diagram of a circuit which may be used to generate return signals for use in the generator of FIGURE 5.
FIGURE 7 is a timing pulse diagram useful in explaining the operation of the generator of FIGURE 5.
FIGURES 8 and 9 are diagrams of gating circuits which may be used in the embodiments of FIGURES 1 and 5 in generating sequences containing odd numbers of pulses; and, FIGURE 10 is a schematic diagram of a gating circuit which may be used in generating sequences containing both synchronous and asynchronous pulses.

The timing diagram of FIGURE 4 should be referred to in connection with the following description of the operation of the system of FIGURE 2. It is assumed that initially all the flip-flops of the counter 10 are in their reset condition. Each of the counter "1" outputs then is a "high" level applying an inhibiting input to each of the oscillator input gates. The output of each oscillator gate therefore is a "low" level and the output of the common gate 35 is a "high" level causing the inverter 40 to provide a "low" level output. Therefore, the XA signal line is at a "low" level. Similarly, the YA signal line from oscillator 14 is at a "low" level. Each of the inhibiting lines 24 and 26 is also at a "low" level. In this condition, no timing pulses are generated.

Assume that a start pulse is applied to change the flip-flop FF1 to the set condition at a time $t_0$. Its output therefore changes to a "low" level activating the gate G1 and initiating the first timing pulse TP1 on line 20*a*. The inhibiting line 24*a* also changes to a "high" level and is applied as an inhibiting input to the even oscillator gate G2. The various levels at time $t_0$ are indicated in the top four lines of FIGURE 4. The high output of oscillator gate G1 is applied to the common gate 35 changing its output to a "low" level. However, this "low" level is not applied to inverter 40 until after the delay time $\Delta t1$ of delay circuit D1. After this delay time the inverter 40 produces a "high" level changing the XA line from the "low" to a "high" level.

The "high" level XA signal is applied to the advance inputs of all the odd stage flip-flops advancing the set state from FF1 to FF2. At this time flip-flop FF1 is reset changing its "1" output from the "low" to a "high" level. Also at this time the XA line applies a "high" level input to the gate G1. The gate G1 output therefore returns to the previous "low" level terminating timing pulse TP1. Thus, the length of the timing pulse is determined by the delay circuit D1 and is independent of the turn-off time of the counter flip-flop FF1. The "low" level from gate G1 is applied to common gate 35 which, in turn, applies a "high" level to the input of delay circuit D1.

During the presence of timing pulse TP1, a "high" level input is applied via inhibit line 24*a* to the input of gate G2 of the oscillator 14. Thus, the gate G2 cannot be activated during the timing pulse TP1 even though the FF2 "1" level changes from a "high" to a "low" value during TP1. At the end of TP1, the inhibiting level is removed from input 24*a* of the even oscillator gate G2. The "low" level output of flip-flop FF2 therefore activates odd oscillator gate G2 initiating timing pulse TP2 which appears on lead 22*a*. Note that, in the worst case, if the turn-off time of the flip-flop FF1 is longer than the delay time D1, it is possible to obtain a "spike" from gate G1 since the XA level would be "low" at this time. This possibility can be eliminated by making the delay time of circuit D1 twice as long as the flip-flop turn-off time.

The time relationship between the XA, TP1 and TP2 signals is indicated in FIGURE 4. As indicated in FIGURE 4, the trailing edge of timing pulse TP1 occurs substantially at the same time as the leading edge of timing pulse TP2 and no overlap occurs between these pulses due to the inherent delay of the shift register. If the timing pulse TP2 were started before the timing pulse TP1 ended, both TP1 and TP2 would be active for the time indicated by the shaded area and this could cause undesired gating. Such overlap is frequently referred to as a "race" condition and occurs when one circuit switches to an "on" condition before another circuit can switch to an "off" condition. Essentially, the switching time involved in terminating or initiating a timing pulse is that of a pair of gating circuits, namely switching the state of the counter flip-flop and switching off an input gate. This should be contrasted with many of the prior art pulse generators which require the switching of a larger number of gating and flip flop circuits before the present timing pulse is ended and the next timing pulse started. Also, note that the start pulse is terminated before the delay time $\Delta t1$ in order to prevent the flip-flop FF1 from again becoming set. Thus, as indicated in FIGURE 4, the start pulse is terminated at a time $t1$ which is less than the delay time $\Delta t1$.

The "high" level output from the odd oscillator gate G2 causes the output level of the OR gate 39 to change to a "low" level. After a delay time D2, determined by delay circuit D2, this "low" level is changed by the inverter 41 to a relatively "high" level which appears on the advance line YA. The high level signal YA advances the set state from FF2 to FF3 and resets FF2. The "high" YA level applied to gate G2 terminates the timing pulse TP2. The gate G2 inhibiting level appearing on lead 26*a* also changes from a "high" to a "low" value at this time enabling input gate G3 at one input.

In FIGURE 4, the delay time $\Delta t2$ of timing pulse TP2 is indicated to be equal to the delay time $\Delta t1$. Thus, the signal level XA also changes from the "high" to the "low" level at this time enabling the gate G3 at the second input. However, if desired, the delay times $\Delta t1$ and $\Delta t2$ may be unequal to each other with $\Delta t1$ greater or less than $\Delta t2$ as desired. If the delay time $\Delta t1$ is greater than $\Delta t2$ then the odd numbered timing pulses would have a longer duration than the even timing pulses, and vice versa when the delay time $\Delta t1$ is less than the delay time $\Delta t2$. It should be noted, however, that even when the delay times are unequal, the trailing edge of any one pulse is still substantially coincident with the leading edge of the next succeeding pulse.

The "1" output of FF3 is now "low" and activates the gate G3 of the odd oscillator 12 initiating timing pulse TP3. After the delay time $\Delta t1$, the output line XA goes "high" shifting the set state from FF3 to the next successive flip-flop FF4 and resetting flip-flop FF3. At this time, the inhibiting level resulting from TP3 is removed from the gate G4 of the even oscillator circuit 14. The "low" level output from FF4 initiates the timing pulse TP4. The operation continues in this fashion with the oscillators 12 and 14 generating alternate ones of the timing pulses until the final timing pulse TPN of the sequence is generated. If the feedback path 32 is not present or opened, no further sequences will be generated until a new start pulse is applied.

The generator of FIGURE 1 is assumed to be of the synchronous type. FIGURE 5 is an arrangement of a pulse generator system providing asynchronous timing pulses. By asynchronous is meant that the spacing between any two successive pulses is variable and depends upon the time of operation of a particular unit which may be external to the generator. That is, a first pulse may command a unit to perform an operation and the succeeding timing pulse cannot be generated until after that unit has completed its operation.

The system of FIGURE 5 is similar to that described in connection with FIGURE 2 except that the input gates of the oscillators 12 and 14 do not receive the inhibiting timing pulses directly, but instead receive return pulses RT1 through RT(N) from an external unit. Thus, an input gate, for example the gate G1, is inhibited from producing a timing pulse TP1 until a return signal RT(N), which is generated by the last pulse of the preceding sequence, is "low." At this time the gate G1 initiates the timing pulse TP1.

An illustrative arrangement for providing return pulses is shown in FIGURE 6. The operating unit 60 receiving a timing pulse may be any unit of the data processing machine, for example, an asynchronous adder unit. It is assumed that this unit is activated by one of the timing pulses, for example pulse TP2, from oscillator 14. The end of the operation is indicated when a test condition, i.e., final carry sensed, is met and a return signal, for example RT2, is applied to the output line 62. The RT2 signal is applied to the TP3 input gate of the odd pulse generator 12 initiating this timing pulse.

The timing diagram of FIGURE 7 illustrates the operation of the system of FIGURE 5. For convenience, only three timing pulses TP1, TP(N–1) and TN are indicated. It is assumed that the system is operating and at a time $t5$, the timing pulse TP(N–1) is initiated. At this time the XA level is "low," the YA level is changing from a "high" to a "low" level, the RT input to the odd gates is changing from a "low" to a "high" level, and the RT input to the even oscillator gates is changing from a "high" to a "low" level. The timing pulse TP(N–1) has a duration $\Delta t1$ determined by the delay circuit D1. This timing pulse is used to activate one of the asynchronous units which is assumed to require the time $\Delta t3$ to perform its operation and indicate a result on one of the return lines. Prior to this time the XA level has changed from the "high" to the "low" level since it remains "high" only for the time $\Delta t1$ thereby enabling the even oscillator input gates. At the end of the later time $\Delta t3$, the RT level changes from a "high" to a "low" level enabling the next succeeding even gate of oscillator 14. At this time the timing pulse TN is initiated and continues for the time $\Delta t2$ determined by the delay circuit D2. At the end of the time $\Delta t2$, the YA level changes from the "high" to the "low" level enabling the return gates for the odd oscillator circuits. At the end of the time $\Delta t4$, an indication is received from the operating unit receiving timing pulse TN and the RT even level changes from a "high" to a "low" value enabling the input gates of the odd oscillator circuit 12. At this time the timing pulse TP1 is initiated. The operation continues in this fashion with the delays between any two successive pulses in the sequence being determined by the length of time necessary to generate a return signal.

In connection with both FIGURES 2 and 5, it was assumed that an even number of pulses were generated in each sequence. An odd number of pulses can be generated by adding an additional gate N+1, indicated in FIGURE 8, to the odd oscillator circuit 12 and an additional flip-flop N+1 to the counter 10. This additional gate then generates a timing pulse output TP(N+1). The output on inhibit lead 26(N+1) is also applied as an inhibiting input to the gate G1. The gate (N+1) also receives as an inhibiting input the signal appearing on lead 26(N). Note, however, that under these circumstances the odd oscillator circuit 12 is used to generate both the final pulse of one sequence and the first pulse of the next succeeding sequence. However, the level XA remains high for the time interval $\Delta t1$ subsequent to the generation of the timing pulse TP(N+1). Accordingly, the gate G1 is prevented from initiating the first timing pulse TP1 of the next sequence until after the delay time $\Delta t1$. This means that when the systems of FIGURES 2 and 5 are used to generate odd numbers of pulses, then successive sequences of the timing pulses have a gap $\Delta t1$ which in some cases is permissible.

However, in other cases it is desired that the first pulse of a succeeding sequence be initiated during the time that the last pulse of the preceding sequence is terminated. Successive sequences of undelayed pulses can be obtained by including the additional gating circuits of FIGURES 8 or 9. In FIGURE 8, an additional input gate G(N+1) is added to the odd oscillator circuit 12. This gate receives one input from the counter flip-flop FF(N+1), a second inhibiting input from the inhibit lead 26(N), and a third input $\overline{YA}$. The $\overline{YA}$ input is obtained from the output of delay circuit D2 of either FIGURES 2 or 5.

Referring to the timing diagram of FIGURE 4, it is seen that the level $\overline{YA}$ which is complementary to the level YA is "high" at the same time as the XA level and returns to a relatively "low" level at the same time as the XA level. Accordingly, the gate G(N+1) is inhibited during the generation of the preceding even pulse TN. During this pulse the flip-flop FFN is set changing its "1" output to a "low" level. The $\overline{YA}$ level is now low. Accordingly, at the termination of the timing pulse TPN the odd timing pulse TP(N+1) is initiated and continues for the time $\Delta t2$, while the level $\overline{YA}$ remains "low." After the time $\Delta t2$, the $\overline{YA}$ level changes to a "high" value and the timing pulse TP(N+1) is terminated. The timing pulse TP(N+1) is also used to advance the set stage of the final flip-flop FF(N+1) to the initial flip-flop FF1, and to reset the flip-flop FF(N+1) thereby starting a new timing sequence.

In the arrangement of FIGURE 9, a third oscillator circuit is used. This circuit includes an input gate G(N+1), a delay circuit D3, and an inverter. The delay circuit D3 has a delay time $\Delta D3$ equal to the delay time $\Delta t1$. The output ZA from the inverter is connected as an input to the gate G(N+1). The second input to gate G(N+1) is supplied by the flip-flop FF(N+1), and the third inhibiting input is supplied by the timing pulse TPN output from even oscillator circuit 14. On the termination of the timing pulse TPN, the gate G(N+1) is activated and the timing pulse TP(N+1) is initiated. After a delay time D3, the output ZA of the inverter is applied as a high level input to the gate G(N+1). At the same time the level ZA is applied to reset the flip-flop FF(N+1) and to shift the set state to the first flip-flop FF1. The timing pulse TP(N+1) is applied as an inhibiting input to the first input gate G1 of the odd oscillator, and upon termination of the timing pulse TP(N+1), the first timing pulse of the next sequence is immediately generated.

The pulse generator may be arranged to provide sequences including both synchronous and asynchronous pulses. FIGURE 10 illustrates one arrangement of input gates for providing such a mixed pulse sequence. Here the odd oscillator circuit 12' has the input gates G1 and G(N–1) receiving return signals RTN and RT(N–2), respectively. Thus, these two timing pulses TP1 and TP(N–1) are generated at asynchronous times with respect to the preceding pulses. The gate G3, however, receives as an inhibiting input the output of even oscillator gate G2. Hence, the timing pulse TP3 from gate G3 is generated synchronously with respect to timing pulse TP2. The odd oscillator 14' input gates (not shown) may be similarly modified to produce pulses controlled either by the even timing pulse signals or by return signals.

What is claimed is:

1. A pulse generator comprising a counter having a plurality of ordered stages, a first oscillator having inputs connected to odd numbered ones of said counter stages, a second oscillator having inputs connected to even numbered ones of said counter stages, said oscillators each providing timed outputs, said timed outputs of said first oscillator being connected as inhibiting inputs to said second oscillator, said second oscillator timed outputs being connected as inhibiting inputs to said first oscillator, and said first and second oscillator outputs being connected to said counter to alternately advance the count in said counter.

2. A pulse generator comprising an N-stage counter, where N is a positive integer greater than one, a first oscillator having N/2 input gates each having an input connected respectively to odd numbered ones of said counter stages, a second oscillator circuit having N/2 input gates each having an input connected respectively to even numbered ones of said counter stages, each of said oscillators having a common gate receiving the outputs of all its said input gates, and a delay circuit with means connecting the output of said delay circuit as an input to each of said input gates, means connecting said delay circuit outputs to said counter to alternately advance the count in said counter, each of said input gates providing, when activated, a timing pulse, and means connecting the outputs of respective ones of said input gates of said first oscillator as an inhibiting input to the next higher ordered one of said second oscillator input gates, and connecting the outputs of respective ones of said second oscillator input gates as inhibiting inputs to the next higher ordered ones of said first oscillator input gates.

3. A pulse generator as claimed in claim 2, wherein a certain one or more of said input gates has a further inhibiting input, said further inputs normally inhibiting said certain gates, and means responsive to a timing pulse for changing one of said inhibiting inputs to an enabling input.

4. A pulse generator for generating timing pulses which are either synchronous or asynchronous comprising, a unidistance counter having N-stages, one for each of said timing pulses, where N is a positive integer greater than one, a first oscillator circuit having inputs connected to odd numbered ones of said counter stages, a second oscillator circuit having inputs connected to even numbered ones of said counter stages, said first circuit producing odd numbered ones of said timing pulses and said second circuit producing even numbered ones of said timing pulses, said timing pulse outputs of said first circuit being connected as inhibiting inputs respectively to inhibit the generation of the next higher order even numbered timing pulse, and said second circuit timing pulse outputs being connected respectively to inhibit the generation of the next higher order odd numbered timing pulse, and certain of said circuits having further inhibiting inputs, means responsive to said asynchronous pulses for generating respective return signals, said return signals being coupled to corresponding ones of said further inhibiting inputs, and means coupling the outputs of said oscillator circuits to alternately advance the count of said counter.

5. A pulse generator for generating N timing pulses where N is a positive integer greater than one comprising, a counter having N-stages, a first start-stop oscillator having N/2 input gates respectively connected to odd numbered ones of said counter stages, a second start-stop oscillator circuit having N/2 input gates respectively connected to even numbered ones of said counter stages, said first oscillator providing even numbered ones of said timing pulses and said second oscillator providing odd numbered ones of said timing pulses, a first delay circuit means coupled to the outputs of all said first oscillator input gates, means connecting the output of said first delay circuit means to an input of each said first oscillator input gate and to said counter, a second delay circuit means coupled to the outputs of all said second oscillator input gates, means connecting the output of said second delay circuit means to an input of all said second oscillator input gates and to said counter, and said first and second delay circuit outputs alternately advancing the count stored in said counter.

6. A pulse generator as claimed in claim 5, wherein said first and second delay circuits each have an equal delay time.

7. A pulse generator as claimed in claim 5, wherein said first and second delay circuits each have a delay time different from each other.

No references cited.

ARTHUR GAUSS, *Primary Examiner.*

S. D. MILLER, *Assistant Examiner.*